United States Patent [19]

Böhnensieker

[11] Patent Number: 4,538,919
[45] Date of Patent: Sep. 3, 1985

[54] APPARATUS FOR AUTOMATICALLY PRODUCING SOLUTIONS AT PREDETERMINED DOSAGES

[76] Inventor: Franz Böhnensieker, Vom Stein Strass 27, 4834 Harsewinkel, Fed. Rep. of Germany

[21] Appl. No.: 502,341

[22] Filed: Jun. 8, 1983

[30] Foreign Application Priority Data

Jun. 8, 1982 [DE] Fed. Rep. of Germany ....... 3221589

[51] Int. Cl.³ .................... G05D 11/00; B01F 15/04
[52] U.S. Cl. .................................... 366/162; 137/98
[58] Field of Search ............... 366/134, 152, 160, 161, 366/162, 8, 16, 21, 17, 19, 131; 137/98, 99

[56] References Cited

U.S. PATENT DOCUMENTS

| | | | |
|---|---|---|---|
| 2,894,732 | 7/1959 | Taber | 366/162 |
| 2,912,994 | 11/1959 | Mori | 137/98 |
| 3,345,997 | 10/1967 | Miller | 366/162 |
| 3,744,764 | 7/1973 | Sedam | 366/161 |
| 4,132,483 | 1/1979 | Slaats | 366/162 |

Primary Examiner—Robert W. Jenkins
Attorney, Agent, or Firm—Michael J. Striker

[57] ABSTRACT

An apparatus for automatically producing solutions at predetermined dosages is proposed in particular of cleaning water for pressing machines wherein water is used as main fluid and a concentrate to be added to the water. The apparatus has a dosing device which communicates with a mixing container and includes a reciprocating control slide which alternatingly supplies the main fluid which is under pressure to one side of a plunger which thus reciprocates in dependence on the control slide and discharges the main fluid in the mixing container, each side of the plunger being connected to a piston rod which has a piston through which the concentrate is also exactly discharged to the mixing container.

22 Claims, 5 Drawing Figures

APPARATUS FOR AUTOMATICALLY PRODUCING SOLUTIONS AT PREDETERMINED DOSAGES

SUMMARY OF THE INVENTION

It is a general object of the invention to overcome the difficulties of the prior art.

More particularly, it is an object of the present invention to provide an apparatus for automatically producing solutions at predetermined dosages which allows the mixture of at least the three mediums.

Yet another object of the present invention is to provide an apparatus which is not provided with electrical drives.

A concomitant object of the present invention is to achieve an apparatus for automatically producing solution at predetermined dosages which is simple in construction, reliable in operation and inexpensive to manufacture nevertheless.

In keeping with these objects, and with others which will become apparent hereafter, one feature of the invention resides, briefly stated, in an apparatus comprising a mixing container having an outlet, and a dosing device associated to the mixing container, wherein the dosing device includes a housing having an axis, a control slide reciprocating in an axial direction in the housing under influence of a pressure medium and controlling the supply of the main fluid, and means for discharging the main fluid and the concentrate into the mixing container in a predetermined dosage and simultaneously providing a further predetermined dosage thereof, the discharging and providing means reciprocating under the action of alternate impingement by the main fluid discharged in response to the reciprocating movement of the control slide.

According to a further feature of the invention, the discharging and providing means includes a plunger reciprocating in axial direction within a cylinder and having two contact faces alternatively impinged by the main fluid in accordance with the movement of the control slide for discharging the main fluid to the mixing container, wherein the main fluid providing the movement of the plunger remains in the cylinder and is dischargeable when the other side of the plunger is impinged by the main fluid. For providing the dosage of the concentrate, the plunger is connected to one end of at least one piston reciprocating in a cylinder which is in communication with an inlet for the concentrate and an outlet to discharge the concentrate to the mixing container, wherein the piston reciprocates in accordance with the plunger so that upon discharge of main fluid by the plunger, a concentrate is simultaneously dischargeable to the mixing container at a predetermined dosage.

The control slide according to the invention includes a piston rod which is guided in a cylinder with a play and whose stroke is limited. The piston rod is further provided at its ends as well as in the center with a piston wherein the cylinder is in communication with the mixing container via two ducts and with the main fluid via a further duct. Depending on the position of the control slide, i.e. of the center piston, one of the two ducts is closed thereby providing a connection for the main fluid which is continuously under pressure to the one side of the plunger so that the plunger is shifted thereby forcing the main fluid within the cylinder to flow through the other of the two ducts into the mixing container.

According to a further feature of the invention, each of the pistons located at respective ends of the piston rod communicates with a cylinder space wherein the two cylinder spaces are alternatively impinged by the pressure medium for providing the reciprocating movement of the control slide. In a simple manner each of the cylinder spaces accommodates one portion of a piston rod which is slidable and axially extending. Each piston rod is provided with a groove which is in connection with at least one radially extending bore hole opening in an axially extending channel which leads to the respective cylinder space. It has proven as especially preferable that each groove is alternatively in communication with one of two through holes, wherein one of the through holes being passed by the pressure medium while the other of the through holes is in connection with a pressureless return pipe.

According to still another feature of the invention, each of the piston rods facing the respective piston of the control slide provided with a stop member wherein each of the springs has one end resting on the respective stop member while its other end abuts the casing. At least one of the piston rods is further provided at its other end remote to the respective stop member with a retainer projecting from the casing.

The advantage of the apparatus according to the invention resides in the fact that the main fluid which is usually water is used as means for moving the plunger and is simultaneously the fluid to be mixed in the mixing container. Furthermore, since the movement of the plunger is obtained through the use of water, the apparatus is explosion-proof. A further advantage is obtained by the development of the mixing container in which three mediums can be mixed. The apparatus is simple in construction and nevertheless allows the mixture of three mediums without external energy in the area of parts pro mille in very exact manner.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
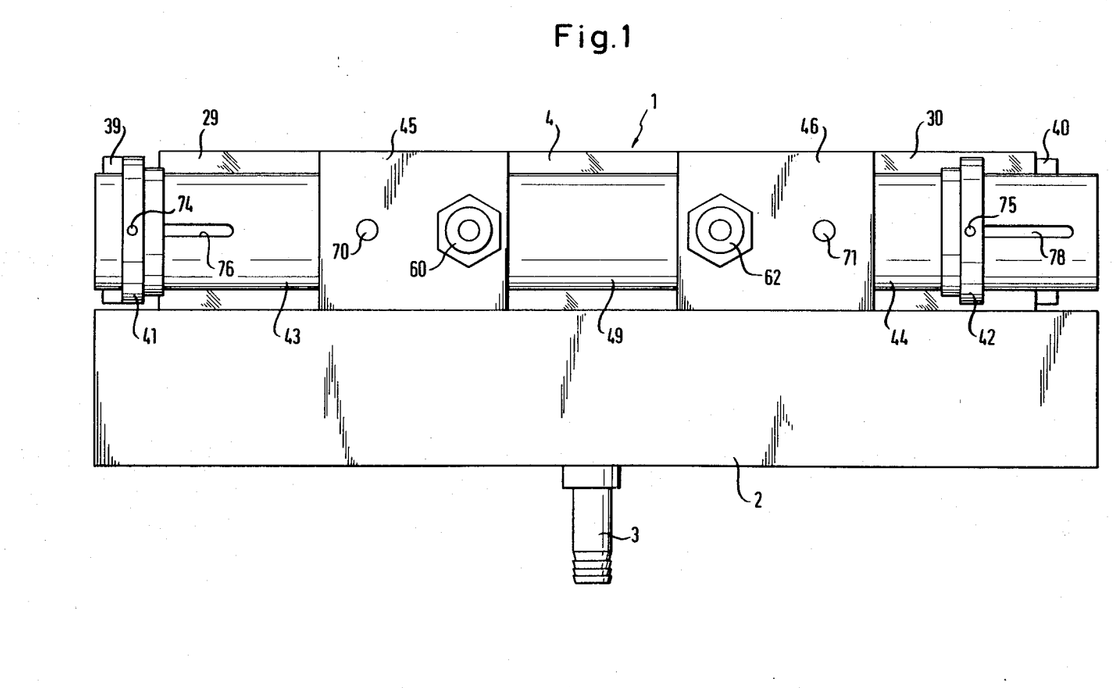
FIG. 1 is a side view of the apparatus according to the invention.

Referring firstly to FIG. 1, there is shown a dosing device 1 which is screwed in a not shown manner to a mixing container 2 which is provided with an outlet 3 for the solution to be mixed, for example cleaning water. The solution is then supplied to for example a pressing machine. As can be further seen from FIG. 1, the dosing device is accommodated in a housing 4.

Figure 2:
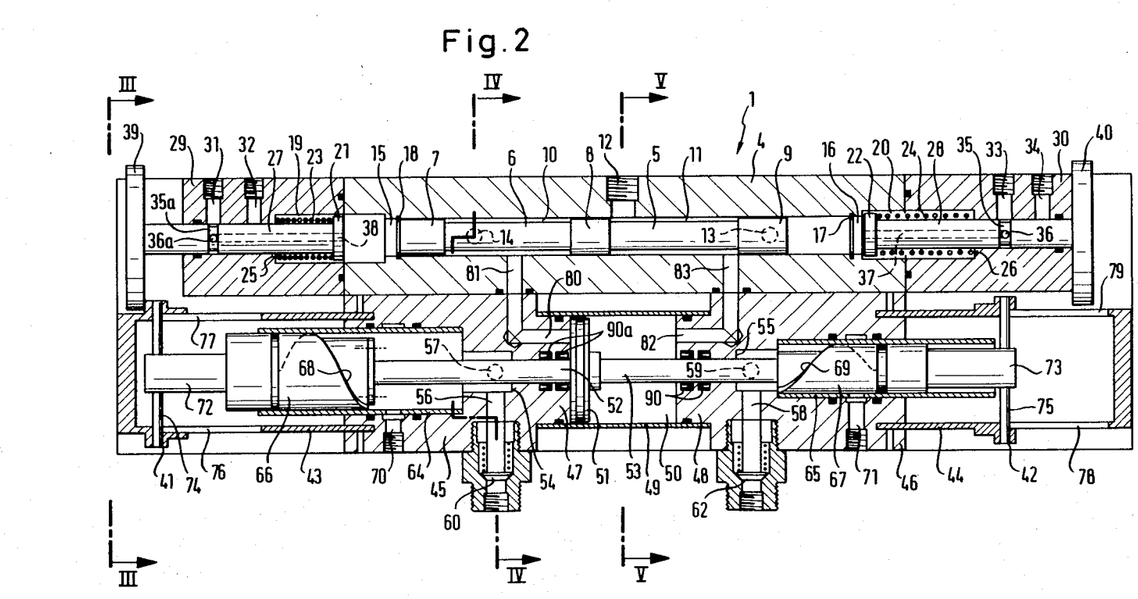
FIG. 2 is a top view of the apparatus of FIG. 1.

Referring now to FIG. 2, it can be seen that the dosing device 1 includes a control slide 5 reciprocating in axial direction. The control slide 5 includes a piston rod 6 whose respective ends and center is provided with a piston 7, 8, 9. Through the provision of such a control slide, two cylinder chambers 10, 11 are provided wherein depending on the position of the control slide 5, i.e. of the piston 8, one of the cylinder chambers 10, 11 is in connection with the main fluid via a duct 12. It is to be noted that the main fluid is continuously under pressure. When the control slide has occupied the position as shown in FIG. 2, the piston 9 is closing a duct 13 which is connected to the mixing container 2 while the duct 14 which is also connected to the mixing container is open, the purpose thereof being described hereinbelow.

The stroke of the control slide 5 is limited in axial direction by spaced locking rings 17, 18 which are alternatingly abutted by the respective pistons 7 and 9 so that intermediate spaces 15, 16 are obtained. Two further cylinder spaces 19, 20 are arranged in axial direction subsequent to the intermediate spaces 15, 16 in which cylinder spaces 19, 20 piston rods 27, 28 respectively protrude. The ends of the piston rods 27, 28 which face each other are each provided with a stop member 21, 22. In each of the cylinder spaces 19, 20, a pressure spring 23, 24 is arranged abutting the respective stop member 21, 22 with one end thereof while the other end of the spring is resting on the respective wall 25, 26 of the cylinder space. Each of the piston rods 27, 28 is guided in a casing 29, 30 in a sealing manner wherein for example, the casing 30 is fixedly connected to the housing 4 (not shown).

The casing 29 as well as the casing 30 is provided with two through holes 31, 32; 33, 34. The through holes 32 and 33 are connected with a return pipe and the through holes 31 and 34 are connected to a source of pressure medium.

In the position as illustrated in FIG. 2, the through hole 34 is covered by the piston rod 28, while the through hole 33 is in connection with a groove 35 which is cut into the piston rod 28. The groove 35 is in communication with the intermediate space 16 via radially extending bore holes 36 and an axially extending bore hole 37. The piston rod 27 is equally provided. As shown in FIG. 2, the borehole 32 is closed by the piston rod 27 while the through hole 31 which is connected to the pressure medium source is in connection with a groove 38a. The groove 38a is connected to the intermediate space 15 via radial bore holes 36 and an axially extending bore hole 37.

Figure 3:
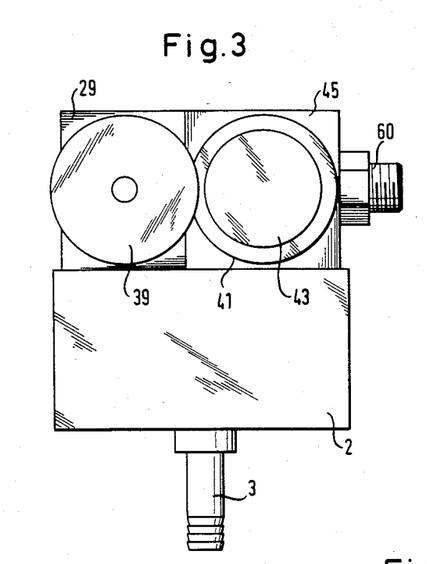
FIG. 3 is a sectional view along line III—III according to FIG. 2.

Each of the piston rods 27, 28 is provided at its end remote to the stop member 21, 22 with a retainer 39, 40 wherein the retainers 39, 40 project beyond the casing 29, 30 and cooperate with respective reverse members 41, 42 as can also be seen from FIG. 3. Each of the reverse members 41, 42 surrounds a respective sleeve 43, 44 which is rotatably mounted in respective housings 45, 46 with one end thereof. The mounting of the sleeves 43, 44 is in such a manner that no axial movement can occur. The housings 45, 46 are screwed to the casing 4 in a sealing manner and are each provided with a projection 47, 48 facing each other. A pipe 49 surrounds both projections 47, 48 so that a cylinder space 50 is provided in which a plunger 51 is arranged. On both sides of the plunger 51, axially extending piston rods 52, 53 are mounted wherein the piston rod 52 projects in a step-shaped space 54 of the housing 45 while the piston rod 53 projects in a step-shaped 55 of the housing 46. In the area of the smaller diameter of the step-shaped spaces 54, 55, each housing 45, 46 accommodates two conduits 56, 57; 58, 59. The conduits 56; 58 are in communication with a supply line for a concentrate while the conduits 57; 59 are in connection with the mixing container as can be seen from FIG. 4. All the conduits 56, 57; 58, 59 are provided with alternatingly acting check valves 60, 61; 62, 63.

In the area of the larger diameter of the step-shaped spaces 54, 55, pipes 64, 65 are arranged which serve for guiding pistons 66, 67 which are connected respectively to the piston rods 52, 53. The pistons 66, 67 have different diameters and are each provided with a spiral-shaped face 68, 69. The pistons 66; 67 can be rotated so that depending on the rotational position of each piston, connections 70; 71 which for example lead to the atmosphere can be closed by the piston 66, 67 upon axial movement of the plunger 51. Through such a provision, the maximum concentrate quantity to be supplied is limited.

For obtaining rotational movement, the pistons 66, 67 are provided with extensions 72, 73 through which bolts 74; 75 are mounted transverse to the piston axis. The bolts 74; 75 protrude through oblong holes 76, 77; 78, 79 located in the sleeves 43; 44 and project therefrom and are connected with their ends in not shown bore holes of the reverse members 41, 42.

As can be seen from FIG. 2, the cylinder space 50 is connected to the cylinder chambers 10, 11 via bore holes 80, 81; 82, 83 (see also FIG. 5) wherein the bore hole 80 is separated from the bore hole 82 by the plunger 51.

Furthermore, it is to be noted that the plunger 51 is sealed against the pistons 66; 67 by respective sealing means.

Figure 4:
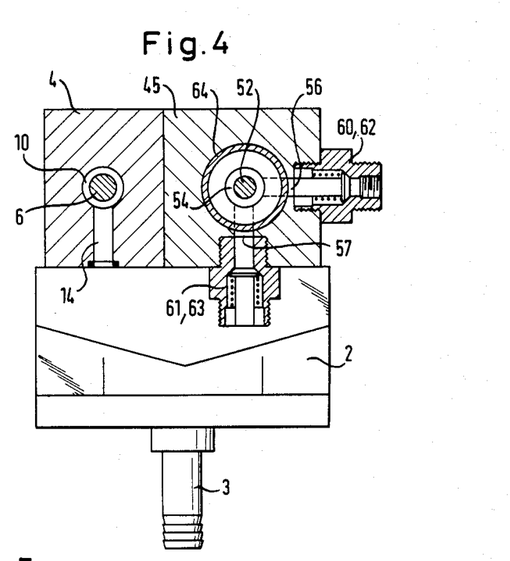
FIG. 4 is a sectional view along line IV—IV according to FIG. 2.
Figure 5:
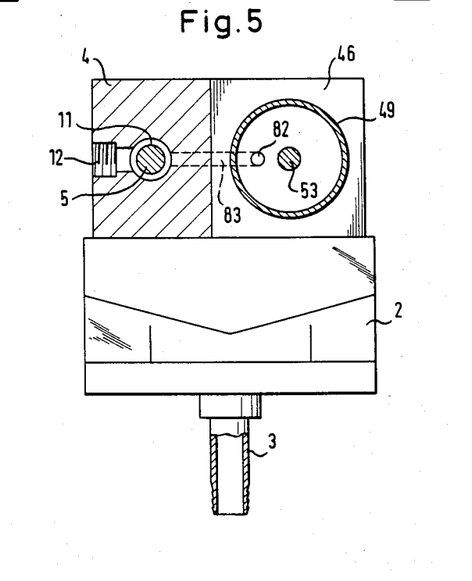
FIG. 5 is a sectional view along line V—V according to FIG. 2.

As can be seen from FIGS. 4 and 5, the mixing container 2 is arranged below the dosing device 1 and contains several superposing chambers 83, 84, 85 which are connected to each other by at least one narrow gap 86, 87, 88. The so formed upper chamber 83 is connected to the dosing device while the lower chamber 85 is connected via the outlet 3 to for example a pressing machine.

After having described the individual parts of the apparatus according to the invention, the mode of operation will now be illustrated in detail:

When the apparatus according to the invention has the position as illustrated in FIG. 2, pressure medium flows through the bore hole 31 via groove 38a, radial bore holes 36 and axial bore hole 37 to impinge piston 7 of the control slide 5. Consequently the control slide 5 is axially moved until the piston 9 abuts the locking ring 18. During this axial movement of the control slide, the duct 14 is closed by the piston 7 while the duct 12 is connected to the cylinder chamber 10. Consequently, the cylinder chamber 11 is separated from the duct 12 and is connected to the duct 13. As soon as this has happened, the pressurized main fluid flows through the duct 12 into the cylinder chamber 10 and finally through the conduits 80 and 81 and impinges the plunger 51 which is consequently moved to the right. Therefore, the main fluid located within the cylinder space 50 is discharged via the conduits 82 and 83 and the cylinder chamber 11 into the mixing container via the duct 13. During the movement of the plunger 51 towards the right, the piston 67 is smultaneously moved to the right and draws in concentrate into the cylinder space 55 via conduit 58. During the suction of concentrate through conduit 58, conduit 59 which is in connection with the mixing container 2 is blocked by the check valve 63. Simultaneously with the movement of the piston 67 towards the right, the piston 66 is moved in the same direction. During this movement, the piston 66 closes at first the connection 71. Thereafter, the piston 66 presses the concentrate located within the cylinder space 54 into the mixing container 2 via conduit 57 while the conduit 56 is blocked by means of check valve 60. Following the movement of the pistons 66, 67, the reverse members 41, 42 have also moved to the right as did also the retainer disk 39 because of the exerted force of spring 23. When spring 23 is almost completely released, the reverse ring 41 abuts the retainer disk 40 and further moves the retainer disk 40 to the right thereby tensioning spring 24. In the now obtained end position of the pistons 27, 28, the groove of the piston 27 is connected with the through hole 32 which is connected to the return pipe and the groove of piston 28 is connected to the through hole 34 which is communicating with the pressure medium source so that the course of movement of the apparatus is now reversed in analogous manner.

It will be understood that each of the elements described above, or two or more together, may also find a useful application in other types of apparatus for automatically producing solutions in predetermined dosages differing from the types described above.

While the invention has been illustrated and described as embodied in an apparatus for automatically producing solutions in predetermined dosages, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that from the standpoint of prior art fairly constitute essential characteristics of the generic or specific aspects of this invention.

What is claimed as new and desired to be protected by Letters Patent is set forth in the appended claims:

1. An apparatus for automatically producing solutions in predetermined dosages of a main fluid and a concentrate added to the main fluid, the apparatus comprising: a mixing container; a dosing device associated to the mixing container, the dosing device including means for discharging the main fluid into the mixing container in a predetermined amount and including a plunger reciprocating in a cylinder between two end positions and having two sides with control means for alternately supplying the main fluid under pressure into the cylinder to impinge one and the other side of the plunger wherein the main fluid causing a movement of the plunger in one direction remains in the cylinder and is dischargeable to the mixing container when the main fluid impinges the plunger to cause a movement of the plunger in the opposite direction, and means for discharging the concentrate to the mixing container and including at least one piston reciprocating in a further cylinder having inlet means for introducing the concentrate into the further cylinder and outlet means for discharging the concentrate contained in the further cylinder to the mixing container, the piston being coupled with the plunger for reciprocation in accordance with the latter, whereby upon discharge of the main fluid remained in the cylinder by the plunger a predetermined amount of concentrate is discharged by the piston to the mixing container.

2. Apparatus as defined in claim 1, wherein the means further includes a second such piston reciprocating in a still further cylinder, the plunger being connected to the one and to the second pistons at each contact face thereof.

3. Apparatus as defined in claim 2, wherein the plunger is sealed against each piston.

4. Apparatus as defined in claim 2, wherein the two pistons have different diameters.

5. Apparatus as defined in claim 1, wherein the means further includes a reverse member, the other end of the one piston being provided with an extension, the reverse member being connectable to the extension and projecting beyond the further cylinder of the piston.

6. Apparatus as defined in claim 5, wherein the control slide includes an axially extending piston rod which is provided with a piston at each end thereof and in the center, so as to form two cylinder chambers separated from each other by the center piston.

7. Apparatus as defined in claim 6, wherein the dosing device further includes two ducts and a further duct, each of the cylinder chambers of the control slide being in communication with the mixing container via one of the two ducts and with the main fluid which is continuously under pressure via the further duct so that depending on the position of the center piston of the control slide one of the two ducts is closed thereby providing a connection for the main fluid to one side of the plunger which is thus shifted and thereby forcing the main fluid located within the cylinder of the plunger to flow through the other of the two ducts into the mixing container.

8. Apparatus as defined in claim 6, wherein the dosing device further includes two casings each arranged at the respective ends of the piston rod, and accommodating a cylinder space, each of the pistons located at respective ends of the piston rod communicating with the respective one of the two cylinder spaces, wherein the cylinder spaces ae alternatively passed by the pressure medium for providing the reciprocating movement of the control slide.

9. Apparatus as defined in claim 8, wherein each of the cylinder spaces accommodates one portion of a slidable and axially extending further piston rod, each of the piston rods being provided with a groove, at least one radially extending bore hole which is in connection with the groove and an axially extending channel in which the bore hole opens and which leads to the respective cylinder space.

10. Apparatus as defined in claim 9, wherein the dosing device further includes two springs, each of the further piston rods being under the action of one of the springs and is slidable against the force exerted by the spring.

11. Apparatus as defined in claim 10, wherein each of the further piston rods has one end which face each other provided with a stop member, each of the springs having one end resting on the respective stop member while the other end thereof abuts the respective casing.

12. Apparatus as defined in claim 11, wherein at least one of the piston rods has another end remote to the respective stop member which end projects beyond the casing and is provided with a retainer.

13. Apparatus as defined in claim 12, wherein the retainer cooperates with the respective reverse member provided at the other end of the piston which is associated to the plunger.

14. Apparatus as defined in claim 9, wherein each of the casings is provided with two through holes and wherein the dosing device further includes a pressureless return pipe, the groove provided in the respective one of the further piston rods being alternatively in communication with one of the two through holes, one of the through holes being passed by the pressure medium while the other of the through holes is in communication with the pressureless return pipe.

15. Apparatus as defined in claim 6, wherein the dosing device further includes two locking rings spaced in axial direction, the stroke of the control slide being limited by the locking rings which are alternatingly abuttable by the piston arranged at the respective ends of the piston rod.

16. Apparatus as defined in claim 6, wherein the piston rod is guided in the cylinder chambers with a play.

17. Apparatus as defined in claim 5, wherein the means further include a rotatable sleeve, the cylinder of the piston associated to the plunger being concentrically surrounded by the rotatable sleeve which is provided with two diametrically opposing axially extending oblong holes, and wherein the extension is further provided with a bolt arranged transverse to the axis of the piston, the bolt protruding the oblong holes and having one end projecting from the oblong holes wherein the projecting end is connected to the reverse member.

18. Apparatus as defined in claim 1, wherein the one piston is provided with an outer spiral-shaped face and is rotatable for adjusting the flow volume of the concentrate.

19. Apparatus as defined in claim 1, wherein the further cylinder of the one piston is connected to the atmosphere for limiting the quantity of concentrate to be supplied.

20. Apparatus as defined in claim 1, wherein the inlet and the outlet is each provided with a check valve.

21. Apparatus as defined in claim 1, the dosing device further includes two conduits, the cylinder in which the plunger reciprocates being in communication with the two conduits separated from each other by the plunger.

22. Apparatus as defined in claim 1, wherein the mixing container is arranged below the dosing device, the mixing container having several superposing chambers connected to each other by at least one narrow gap, the uppermost chamber being in connection with the dosing device while the lowermost chamber is connected to the outlet.

* * * * *

UNITED STATES PATENT AND TRADEMARK OFFICE
CERTIFICATE OF CORRECTION

PATENT NO. : 4,538,919

DATED : September 3, 1985

INVENTOR(S) : Franz Böhnensieker

It is certified that error appears in the above-identified patent and that said Letters Patent is hereby corrected as shown below:

Column 1, after line 3, insert the following paragraphs:

BACKGROUND OF THE INVENTION

The invention relates to an apparatus for automatically producing solutions in predetermined dosages. In particular the invention is concerned with an apparatus for automatically producing cleaning water for printing machines using water as main fluid and at least one concentrate added to the water.

From the German patent DE-PS 14 57 277, an apparatus for automatically producing solutions in predetermined concentrations is known in which a measuring bowl for the dosage of a chemical additive, a storage container connected to the measuring bowl as well as a mixing container is used. In the mixing container, a float is provided which supplies main fluid when the liquid level in the mixing container is in its lowest position and which closes the supply of main fluid when the liquid level is in its upper position. The measuring bowl which is developed as a float and provided for the chemical additive is arranged in the mixing container below an outlet connection which is associated to a bottom plate of an otherwise closed storage container. In the supply conduit of the main fluid, a jet pump is provided having an intake stack which immerses into the measuring bowl when the measuring bowl is lifted to a certain level.

Such an apparatus allows, however, only the mixture of

UNITED STATES PATENT AND TRADEMARK OFFICE
CERTIFICATE OF CORRECTION

PATENT NO. : 4,538,919

DATED : September 3, 1985

INVENTOR(S) : Franz Böhnensieker

It is certified that error appears in the above-identified patent and that said Letters Patent is hereby corrected as shown below:

two mediums. In order to continuously mix three fluids or mediums, such an apparatus has been expanded in such a manner that for the supply of a further fluid to the solution containing the main fluid and the chemical additive, a second float system is provided having a lower float and an upper float which system controls a float switch in such a manner that after rising of the fluid level to a predetermined second level, the float switch interrupts the exciter circuit of the valve controlling the main fluid and consequently interrupts the supply of the main fluid and of the chemical additive and closes the exciter circuit of the valve for the supply of the further liquid so that the further liquid flows to the mixing container until the fluid level has obtained the highest level as determined by the first float system.

UNITED STATES PATENT AND TRADEMARK OFFICE
CERTIFICATE OF CORRECTION

PATENT NO. : 4,538,919

DATED : September 3, 1985

INVENTOR(S) : Franz Böhnensieker

It is certified that error appears in the above-identified patent and that said Letters Patent is hereby corrected as shown below:

It is quite obvious that such an apparatus is rather cumbersome in its structure and rather complicated. A further disadvantage resides in the fact that defects concerning the dosage are obtained when mixing small quantities in the area of pars pro mille. Finally, through the provision of frequently used electric drives, the apparatus has to be provided explosion-proof which results in a rather expensive apparatus.

Signed and Sealed this

Third Day of December 1985

[SEAL]

Attest:

DONALD J. QUIGG

Attesting Officer     Commissioner of Patents and Trademarks